Dec. 15, 1970  L. F. GILBERT  3,548,395
FLAME CONDITION SENSING DEVICE
Original Filed March 25, 1963  3 Sheets-Sheet 1
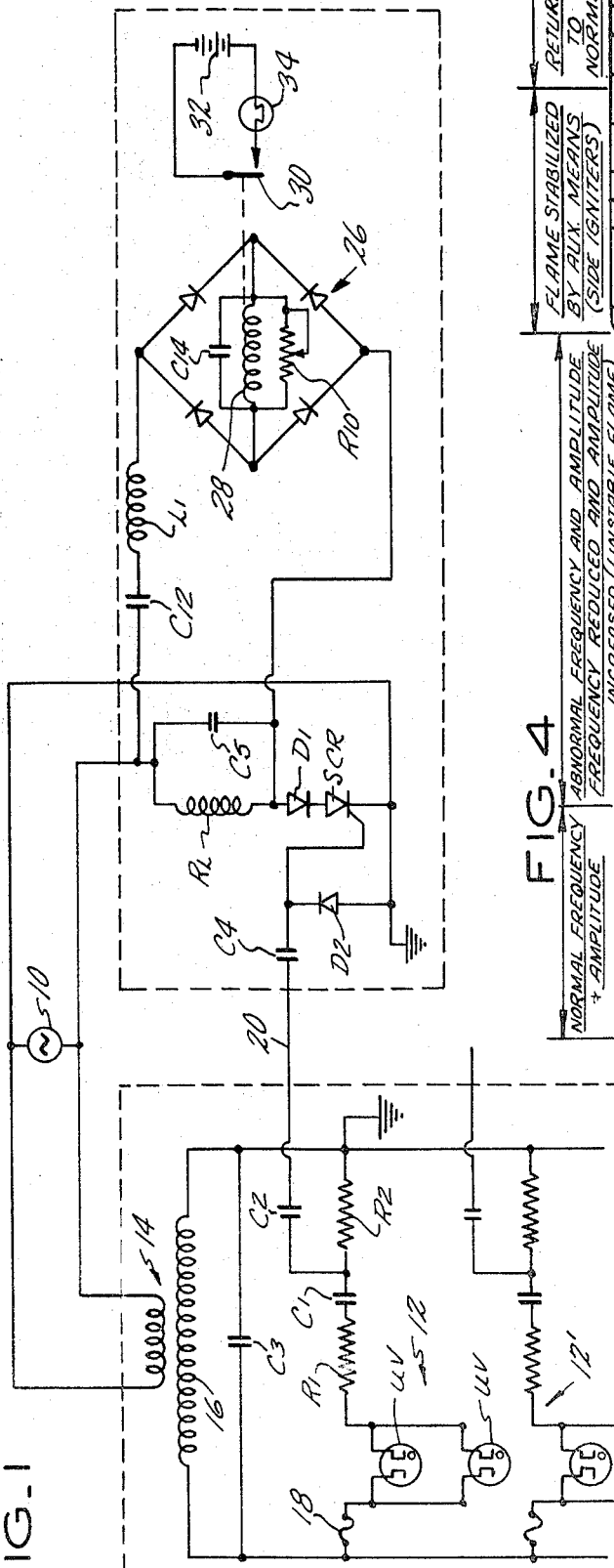
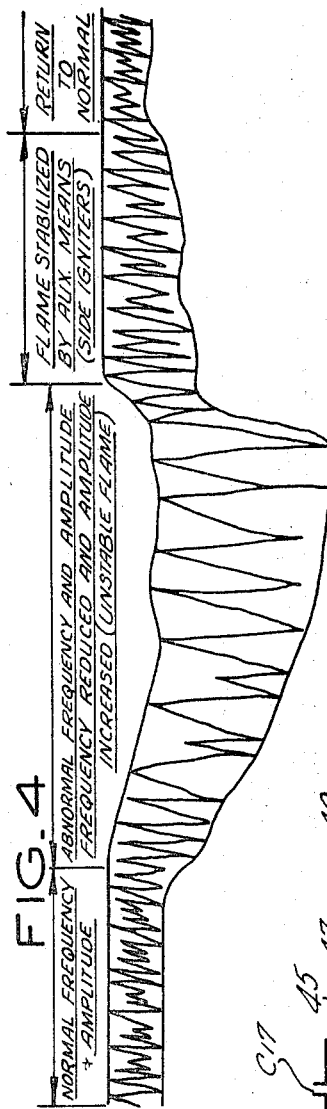
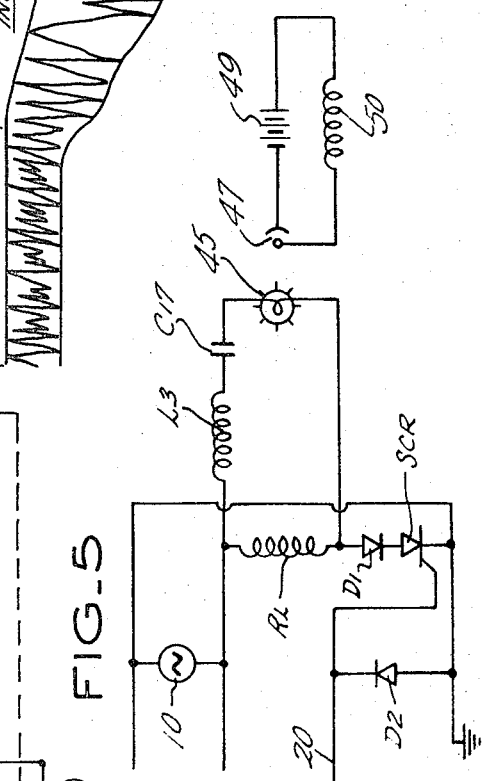
INVENTOR
LYMAN F. GILBERT
BY Eldon H. Luther
ATTORNEY Dec. 15, 1970   L. F. GILBERT   3,548,395
FLAME CONDITION SENSING DEVICE
Original Filed March 25, 1963   3 Sheets-Sheet 2

INVENTOR
LYMAN F. GILBERT
BY Eldon H. Luther
ATTORNEY

Dec. 15, 1970   L. F. GILBERT   3,548,395
FLAME CONDITION SENSING DEVICE
Original Filed March 25, 1963   3 Sheets-Sheet 3

INVENTOR
LYMAN F. GILBERT
BY Eldon H. Luther
ATTORNEY

United States Patent Office 3,548,395
Patented Dec. 15, 1970

3,548,395
FLAME CONDITION SENSING DEVICE
Lyman F. Gilbert, Somers, Conn., assignor to Combustion Engineering, Inc., Windsor, Conn., a corporation of Delaware
Continuation of application Ser. No. 267,587, Mar. 25, 1963. This application Feb. 14, 1966, Ser. No. 536,935
Int. Cl. G08b *17/12*
U.S. Cl. 340—228.2         4 Claims

ABSTRACT OF THE DISCLOSURE

A flame condition indicating system having a glow discharge tube for monitoring the condition of a flame. Circuitry is utilized whereby the flow discharge tube operates out of saturation to provide upon viewing a flame a signal having a random repetition rate varying in accordance with the stability of the flame. Means within the circuitry is provided to recognize the variation in the random repetition rate of an unstable flame to render an indication of such flame instability. Means responsive to the presence or absence of flame or a circuit checking indicator may be included within the circuitry of this invention.

BACKGROUND AND SUMMARY OF THE INVENTION

This is a continuation of application Ser. No. 267,587 filed Mar. 25, 1963 and now abandoned.

This invention relates generally to a system responsive to and operative to indicate the condition of a flame in a furnace with the invention being particularly concerned with an electric indicating or detecting system that is capable of providing an indication as to whether the flame in a furnace is stable or unstable.

The system in accordance with the invention includes an electric circuit which employs a glow discharge tube as the sensing element that senses the presence or absence of flame in a furnace. The circuit is so arranged that a signal is provided, incident to a flame, and which signal has a random repetition rate. The random repetition rate of this signal varies in accordance with the stability of the flame with a stable flame providing a random repetition rate which lies within a predetermined band while an unstable flame provides a random repetition rate lower than that produced by said stable flame. As a result of the difference in the signal produced incident to a stable and an unstable flame, it is possible to provide, and the organization of the invention so provides, means for recognizing this difference and accordingly render an indication of when the flame is unstable. The organization of the invention may provide an indication of the presence or absence of flame in the furnace as well as whether or not the flame is stable or unstable. The electrical flame condition indicating system of the invention is relatively simple, employing few electrical components and it is extremely reliable in its operation, being far more sensitive than prior art detectors of the same general type.

It is accordingly an object of the present invention to provide an improved flame condition indicating system.

It is a further object of the invention to provide such an improved system which is electrical in nature and which provides an indication as to whether or not a flame is stable or unstable.

A still further object of the invention is to provide such a flame condition indicating system which is extremely safe in its operation and that includes means to determine that the system components are operating properly.

A still further object of the invention is to provide such a flame condition indicating system which will determine whether or not a flame is stable or unstable and provide an indication thereof and will also provide an indication as to whether or not there is a flame present.

BRIEF DESCRIPTION OF THE DRAWINGS

FIG. 1 is a circuit diagram of the present invention;

FIG. 4 illustrates a wave form showing the variation in frequency and amplitude of the signal produced across the load in the receiver incident to the presence of a stable flame and an unstable flame as viewed by the sensing tube;

FIG. 5 is a modified circuit arrangement;

DETAILED DESCRIPTION OF PREFERRED EMBODIMENTS

Figure 2:
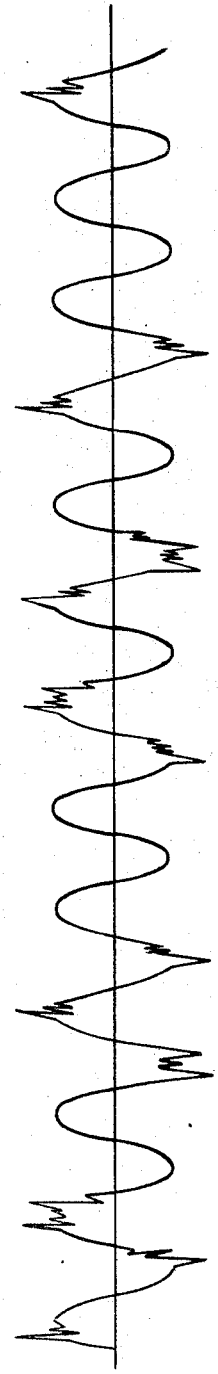
FIG. 2 depicts the wave form produced in the transmitting circuit incident to the firing of the glow discharge tube wherein the tube is not heavily loaded.

Referring to the diagram of FIG. 1 there is provided a source of AC potential identified as 10 and which is effective to power the transmitter 12 of the flame detector through the transformer 14, with the transformer stepping up the voltage of the source, such as from 118 v. AC to 750 v. AC. The frequency of this supply may be the readily available 60 cycles per second. Connected across the secondary 16 of the transformer are one or more glow discharge tubes UV. In series with this tube UV are fuse 18, resistors $R_1$ and $R_2$, and capacitor $C_1$ ($R_2$ may also be a small transformer or inductor). With this circuit the tube UV is lightly loaded so that it may partially conduct and recover, returning to its high impedance state. The operation thus obtained may be that shown in the FIG. 2 wave form illustrations wherein the voltage spikes are shown riding on the 60-cycle AC supply of the UV tube and with these spikes representing the surges or pulses produced incident to firing (avalanche) of the tube. These pulses produce shock excitation of the circuit with the ringing or alternations at the trailing edge of the pulse gradually being damped out.

The wave form depicted in FIG. 2 illustrates the UV tube operating out of saturation, i.e., so that firing of the tube is not uniformly effected during every alternation of the supply potential but with a random firing being effected, with this being essential to the present invention in order to produce the random repetition of the pulses. The criterion as to whether or not the tube operates in or out of saturation depends upon its position with relation to the flame being sensed plus the voltage applied to the UV tube. The energy being sensed follows the inverse square law of radiation and therefore the signal strength will vary inversely as the square of the distance between the sensing tube and the flame. The scanning angle which the sensing tube has to view the flame also affects the energy received directly as the square of the diameter of the circle viewed at the point of the flame envelope.

The sensitivity of the tube may also be adjusted by varying the supply voltage to the transmitter circuit by adjusting the supply voltage of transformer 14. Thus in accordance with the present invention the position of the tube relative to the flame being sensed is such that the voltage applied to the tube is such that tube operates out of saturation producing the random firing shown in FIG. 2.

It is found that for the flame produced by gas, oil, or coal firing (or firing of any hydrocarbon fuel), a tube having an energy sensitive spectrum range of from 2000 angstroms to 3300 angstroms operates satisfactorily. The glow discharge tube, i.e., UV, operates on a breakdown mechanism across a threshold potential with what is termed a Townsend avalanche occurring at breakdown. Thus when a photon of proper energy content, i.e., proper wave length, enters the tube it causes ionization of the gases therein resulting in a very rapid acceleration of electrons across the potential gap of the detector tube. In analyzing the operation of the circuit in which the glow discharge tube is disposed it was found that the speed of the pulse produced by the Townsend avalanche and which is reflected back through the circuit (through shock excitation) has a duration of less than .5 microsecond (corresponding to a frequency of better than two megacycles). It was thus determined that this pulse could be readily separated from the supply voltage and employed in the receiver of the flame detector as the input signal therefor thereby rendering the transmission circuit fail-safe with regard to any shorting or opening of the circuit or the components thereof.

Figure 3:
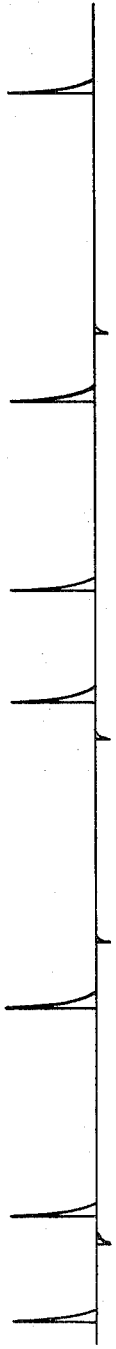
FIG. 3 illustrates the wave form that is the output of the transmitter which is coupled into the receiver as the input therefor.

In the transmitting circuit the RC network established by $R_1$, $C_1$ increases the time during which the very short pulse signal is effective. While this is not essential it does add to the reliability of operation of the circuit. This pulse signal is separated from the 60-cycle supply by means of the separating or filter network identified as $R_2$ and $C_2$. $R_2$ is preferably a wire wound resistor across which a voltage drop is developed by the pulse current established at avalanche ($R_2$ can also be a transformer or inductor). $C_2$ is of such a value as to pass the high frequency pulse while rejecting the 60-cycle source. The separated pulse voltage is thus established between the conductor 20 and ground. FIG. 3 depicts this separated wave form with the negative going pulse being attenuated by shunting to ground through a suitable diode connected to ground for purposes concerned with operation of the receiver as later described. The fuse 18, which may be ⅟₃₂ amp., will cause an opening of the transmitter circuit incident to an overload as a result of the developing of a short.

Figure 2A:
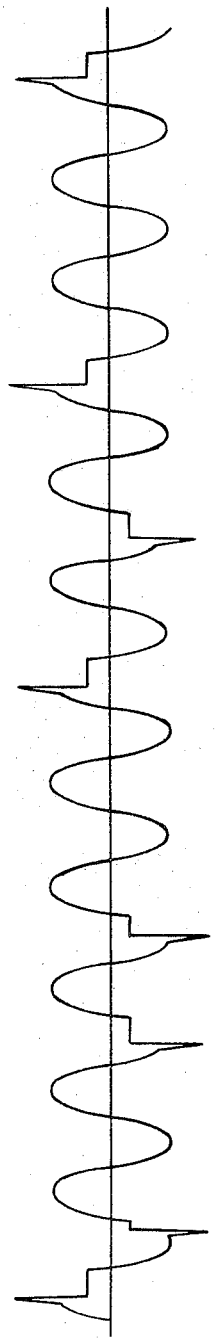
FIG. 2A depicts the wave form produced in the transmitting circuit incident to the firing of the glow discharge tube wherein the tube is heavily loaded.

In the event that the UV tube is heavily loaded rather than lightly loaded as would be the case if the capacitor $C_1$ were eliminated from the circuit or made very large, then the tube would not be able to recover after the avalanche and would continue to carry current until the supply voltage dropped below the cut-off level of the tube. FIG. 2A represents the wave form produced in the transmitter under such conditions. The separated signal leaving capacitor $C_2$ would still be of the nature shown in FIG. 3.

The lightly loaded circuit is several times more sensitive than the heavily loaded circuit. In the heavily loaded circuit high energy photons are required to produce sufficient ionization of the gases within the tube to cause an avalanche. In the lightly loaded circuit photons of much lower energy content but of the proper wave length are sufficient to partially ionize the tube thus causing the pulse to be emitted (avalanche) but the tube is capable of recovering and thus does not lose control. The wave form of FIG. 2 illustrates the frequency of operation with a lightly loaded circuit. The wave form of FIG. 2A illustrates the lower frequency of avalanche occurring from the same energy source with a heavily loaded circuit. It is for this reason that the lightly loaded circuit is perferred thereby taking advantage of the greater sensitivity obtained therewith. However, it is to be understood that the heavily loaded circuit although less sensitive is within the purview of the invention with this circuit distinguishing and separating the signal produced incident to sensing the flame from supply potential of the transmitter.

With this transmitter circuit, should there be a short of the leads to the UV tube, to which prior art organizations have been susceptible, or should there be a short or an opening of any of the components of the circuit the normal pulse signal produced by the transmitter and indicating the presence of a flame will no longer be present wherefore the transmitter is fail-safe or in other words produces a "no flame" signal incident to a malfunction of the circuit. If the UV tube shorts, the pulse signal will no longer be produced and moreover fuse 18 will blow. If $R_1$ and/or $C_1$ short, no detrimental effect will be produced although the duration of the pulse will be decreased and the sensitivity of the circuit will be decreased. If $R_1$ or $C_1$ open, the signal will no longer be produced. If $R_2$ shorts, the signal will no longer be produced through $C_2$ and if $C_2$ shorts, no detrimental effect will be produced unless the corresponding series connected capacitor in the receiver shorts in which case fuse 18 will blow and the signal is no longer produced. Should the transformer short, the signal would no longer be produced.

The transmitter of the flame condition indicator of the invention thus produces a pulse signal of very short time duration which pulse signal is separated from the supply which powers the transmitter and is coupled into the receiver as the input therefor. The transmitter is an extremely simple electrical circuit including the fuse 18, tube UV, $R_1$, $C_1$ forming a pulse shaping or delay network to increase the duration of the pulse and $R_2$ all of which are in series and connected across the secondary 16 of the transformer 14. $R_2$ in cooperation with $C_2$ forms the signal separating network for separating the pulses from the transformer supply potential. Several of the UV tubes may be connected in parallel in a single transmitter with two such tubes being illustrated. This would be desirable when there may be two or more burners or where it is desired to view the flame of a single burner from more than one location.

More than a single transmitter may be operated from the secondary 16 of the transformer. In the illustration of FIG. 1 two transmitters are connected in parallel across the transformer secondary with the second transmitter being indentified as 12' and containing the same components as previously described with transmitter 12. This number can be increased so that eight or more flame detectors may be operated from a single transformer if desired. This is of considerable advantage in large furnace installations wherein as many as 24 flame detectors are utilized with a single furnace. When multiple transmitters are employed with a single transformer, the capacitor $C_3$ is connected across the secondary as a filter to prevent the signal spikes of one transmitter from interacting on other signal separators and UV sensing tubes.

It has been found that the repetition rate of the firing (Townsend avalanche) of the glow discharge tube varies as between a stable and an unstable flame with this repetition rate being substantially higher when the flame is stable than when the flame is unstable. The repetition rate varies in a random fashion at all times. However, with a stable flame this random variation is between upper and lower limits or in other words is in a frequency band which is higher than the frequency band of the random repetition rate produced as a result of an unstable flame.

Figure 3A:
FIG. 3A illustrates the wave form produced in the receiver through the switching action effected by the pulse output of the transmitter. Also illustrated in dotted lines in FIG. 3 is the integrated wave form that appears across the load or output of the receiver.

The receiver of the flame condition indicator of this invention receives the separated pulse signal from the transmitter as its input signal with the pulse signal actuating a switching device in the receiver and with the receiver being operative to develop a driving or power signal that is applied to a load for activating the same. In the illustrative organization of FIG. 1 the pulse signal output of the transmitter is coupled into the receiver through the capacitor $C_4$ which acts to further filter any 60-cycle supply of the transmitter from the signal with the capacitors $C_2$ and $C_4$ providing a safety feature in that satisfactory operation may be obtained if one of these two capacitors should become shorted. The supply potential for the receiver in this illustrative embodiment is a half wave supply and is obtained from the 60-cycle 118 volt source 10. Half wave rectification of the supply is obtained by the diode $D_1$. The receiver is, in effect, switched on and off by the silicon control rectifier identified as SCR. The negative voltage pulses received from the transmitter are shorted to ground through diode $D_2$ while the positive pulses are operative to gate the SCR on with the lead 20 being connected to the gate of the SCR. Once it is gated on the SCR completely loses control and the SCR conducts until its anode to cathode voltage is reduced to a very low value. Accordingly since the pulse output of the transmitter has a randomly varying repetition rate, the SCR is gated on at a randomly varying repetition rate thus resulting in providing a driving signal in the receiver which varies at a random repetition rate. This random signal or random current flow through the receiver is applied to the load relay $R_L$ which, when energized, may cause suitable contacts to actuate an alarm or any other desired equipment. Connected across this load relay is holding capacitor $C_5$ which is effective to store up a sufficient charge to maintain the relay closed during the short intervals when no current is flowing through the receiver with $R_L$ and $C_5$ forming a tank circuit. Thus the relay is continuously engaged as long as the randomly varying pulse signal output of the transmitter is received by the receiver. The $R_L$, $C_5$ network acts as an integrator with regard to the driving signal produced in the receiver providing partial integration of this signal. FIG. 3A illustrates in solid lines the driving pulse produced through the triggering of the SCR while the dotted line wave form illustrates the partial integration of this driving signal that is produced by the $R_L$, $C_5$ network.

It should be noted that the random repetition rate of the driving signal produced in the receiver through the switching action of the SCR is not identically the same as the random repetition rate of the pulses produced in the transmitter of FIG. 1 (lightly loaded) although the random repetition rate of both of these signals is a relatively low value. This difference in repetition rate is a result of the SCR losing control insofar as the gate is concerned once the SCR is gated on. Thus, notwithstanding that there may be two voltage spikes produced in the transmitter for one half wave of the supply voltage or in other words one half of the period of the supply voltage, the first spike will gate the SCR on, and the second spike will accordingly have no effect. This is obvious from a comparison of FIGS. 2 and 3A wherein the second voltage pulse from the left in FIG. 3A corresponds with two voltage spikes riding on the voltage supply of the transmitter. It is found that in operation while sensing a flame satisfactory results can be obtained with circuit parameters to produce a partially integrated driving signal which has an oscillation (dotted lines, FIG. 3) generally between 3- and 15-cycles per second.

As previously mentioned, the repetition rate of the firing of the glow discharge tube and accordingly the repetition rate of the spikes as depicted in FIG. 2 and which gate the SCR on vary as between a stable and an unstable flame with the repetition rate being higher for a stable flame than for an unstable flame. This variation, of course, is also present in the signal developed in the receiver as a result of gating the SCR on, with the repetition rate of the voltage pulses disclosed in FIG. 3A varying in accordance with the output signal of the transmitter. Thus the repetition rate of these pulses is higher when sensing a stable flame than when sensing an unstable flame. This variation is also present in the partially integrated signal that is developed across the load $R_L$. FIG. 4 depicts this variation and is a wave form representing the signal developed across the load $R_L$ with the time axis in this wave form being of very much smaller scale than that of the wave forms of FIGS. 2, 2A, 3 and 3A. As is evident from this FIG. 4 illustration, the frequency of the signal that is developed and applied to the load decreases substantially when sensing an unstable flame as contrasted with sensing a stable flame. For example, a stable flame may produce a signal having a repetition rate of between 3 and 15 cycles per second while an unstable flame may produce a signal having a repetition rate of between 0.1 and 3 cycles per second. These figures are given merely by way of example and regardless of the particular frequencies involved the frequency of the signal produced and developed across the load incident to a stable flame will be substantially higher on the average than that of the signal produced incident to an unstable flame.

The load $R_L$ responds to and is activated throughout the full range of frequency variation, i.e. both the band of frequencies produced incident to unstable flame operation and the band of frequencies produced incident to stable flame operation.

As a result of this variation in frequency between the two operating conditions, i.e. stable flame and unstable flame, it is possible to selectively detect this frequency difference and accordingly provide an indication as to whether the flame that is being observed by the glow discharge tube is stable or unstable. For this purpose there is connected across $R_L$ FIG. 1 a network which includes a tuned circuit that is tuned to the lower band of frequencies produced incident to unstable flame operation. This network includes the bridge rectifier 26 the branch terminals of which are connected across $R_L$ with there being a series resonant circuit in one of these connections including the capacitor $C_{12}$ and the inductor $L_1$. This circuit is tuned to the band of frequencies produced incident to unstable flame operation, such as the 0.1 to 3 cycles per second band previously mentioned, with the Q of this circuit being sufficiently broad to pass this band while blocking higher and lower frequencies. The bridge rectifier 26 has connected across the center terminal of its branches relay 28 with capacitor $C_{14}$ and adjustable resistor $R_{10}$ being in parallel with this relay; the resistor adjusting the sensitivity of the relay and the capacitor integrating the signal applied to the relay and maintaining the relay activated so long as the 0.1 to 3 cycles per second is applied across the branch terminals of the bridge rectifier. Thus, relay 28 will be energized as long as this randomly oscillating or varying signal, within this particular frequency band, is present across the load. This relay 28 is accordingly energized only when an unstable flame is being detected by the detecting system. This relay may operate suitable indicating devices to provide an indication of the presence of an unstable flame. In the illustrative organization this is accomplished by means of connecting contacts 30 of this relay into a circuit that includes the potential source 32 and indicator 34, which may be a light or sound device. The arrangement may be such that upon activation of relay 28 contact 30 is closed activating the indicator 34 providing an indication of the existence of an unstable flame.

In the modification of FIG. 5 there is provided at the output of the receiver a load $R_L$ which may be an inductor, that may take the form of a relay, or which may be a resistor. While no integrating capacitor is shown connected across this load, such may be provided if desired. In this embodiment the network connected across the load and which is selectively responsive to the frequency of the output signal representing an unstable flame includes the light 45 and the LC series resonant circuit comprised of inductor $L_3$ and capacitor $C_{17}$ with this circuit as in the case of the previously defined tuned circuit being tuned to the band of frequencies developed in the output of the receiver incident to the glow discharge tube viewing an unstable flame whereby the light 45 is illuminated when such output is present. Positioned adjacent the light 45 is the photoelectric cell 47 across which is connected the potential 49 and in the circuit of which is provided the relay 50 which relay may actuate an indicating device in the same manner as relay 28 to provide an indication of the presence of an unstable flame and with relay 50 being activated incident to illumination of light 45.

Figure 6:
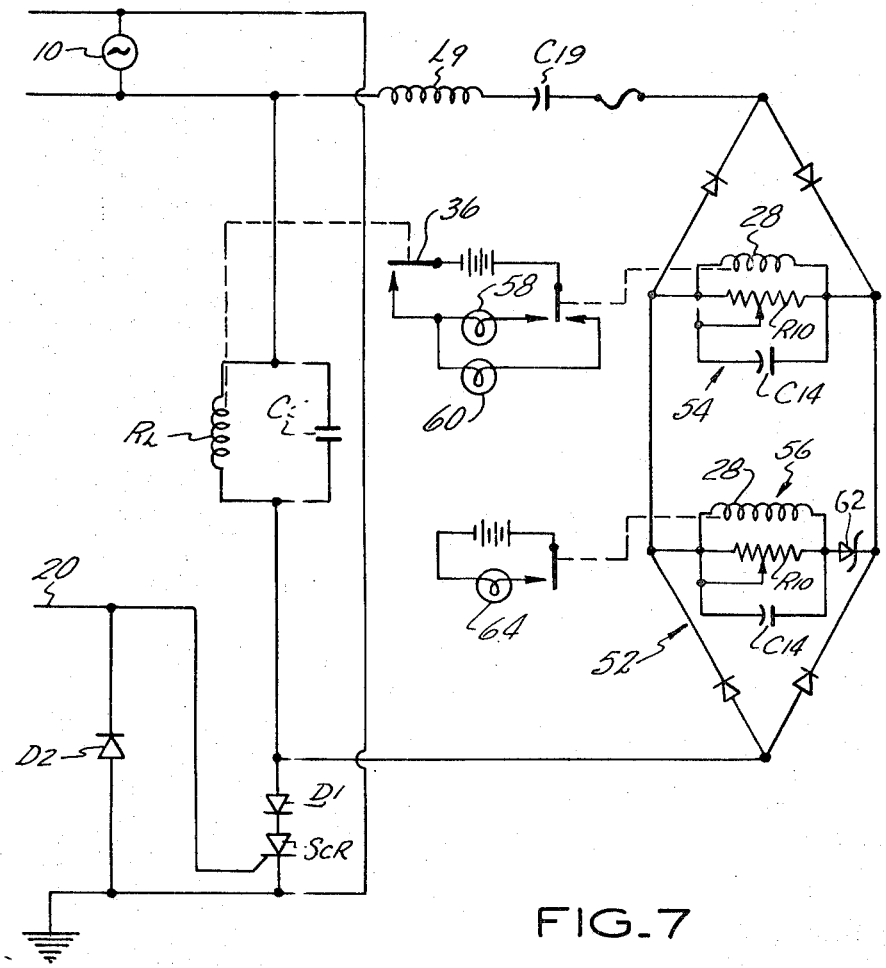
FIG. 6 is a further modified circuit which includes means for determining the presence or absence of a stable or an unstable flame as well as means for testing the operation of the circuit.

The modified circuit organization of FIG. 6 provides an indication of the presence or absence of an unstable flame and additionally provides means for testing the circuit to determine if the components thereof are operating satisfactorily. In this modified arrangement there is connected across the load $R_L$ a network which selectively responds to the entire frequency band covering the frequencies of the signal developed across the load as a result of detecting both a stable and an unstable flame (this band of frequencies may include the range of from 0.1 to 15 cycles as previously mentioned). This network includes the bridge rectifier 52, the branch terminals of which are connected across $R_L$ with capacitor $C_{19}$ and inductor $L_9$ forming a series resonant circuit having a relatively broad Q so as to provide a relatively broad band pass filter that is tuned to this particular band of frequencies (such as 0.1 to 15 cycles per second) thereby passing these frequencies while blocking higher and lower frequencies. Connected across the center terminals of this bridge rectifier and in parallel relation are two relay networks 54 and 56 similar to that described with relation to FIG. 1 and with the components $C_{14}$, $R_{10}$ and relay 28 correspondingly identified.

Relay 28 of network 54, when energized will activate the alarm 58, while de-energized will activate alarm 60, thus an indication is provided as to whether or not a randomly varying signal within this broad band of frequencies is developed across the relay $R_L$. Since this random frequency variation is transmitted throughout the entire circuit from the glow discharge tube, the detection of this signal across $R_L$ provides an indication that all of the components of this circuit are working satisfactorily. The absence of such signal indicates that there is a malfunction in the detector system. The switch 36 is connected between the indicators 58 and 60 and is activated by the load relay $R_L$ so as to open this circuit when the load relay is not activated thereby preventing either of the indicators from being activated when the load relay $R_L$ is not activated.

The relay network 56 includes in its connection across the center terminal of the branches of bridge rectifier 52 a Zener diode 62 which has a predetermined conducting voltage that corresponds to the voltage developed across the output $R_L$ incident to the signal representing an unstable flame. In FIG. 4 it is apparent that as a result of the decrease in frequency or repetition rate of the signal applied to the output of the receiver and which signal is partially integrated by the load, i.e. $R_L$, $C_5$ that the amplitude of this signal also increases wherefor the voltage change developed across the load substantially increases. The Zener diode is of a rating such as to conduct when the voltage change across the load is increased to a value substantially above the voltage change present during stable flame operation, but somewhat below that developed as a result of unstable flame operation. The Zener diode accordingly conducts only during unstable flame operation and accordingly the relay network 56 is activated only at this time with this network when activated energizing the indicator 64 thereby providing an indication of an unstable flame.

Figure 7:
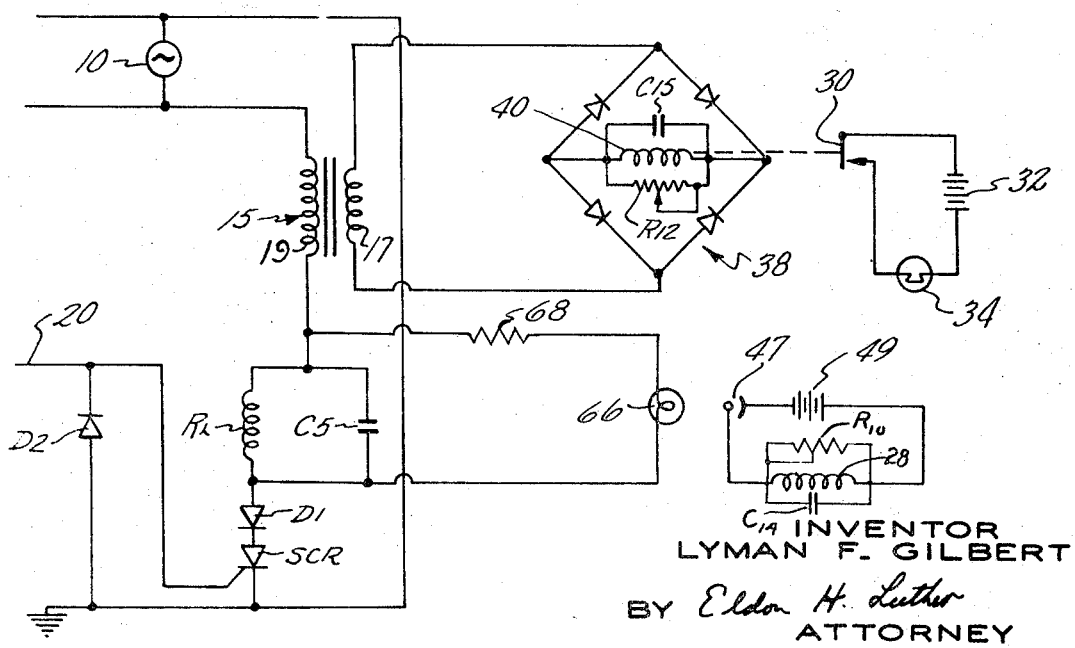
FIG. 7 is a further modified circuit arrangement for determining the flame condition and which also includes means for testing the operation of the circuit.

In lieu of testing the operation of the components of the flame indicating system in the manner depicted and disclosed in FIG. 6, the organization disclosed in FIG. 7 may be employed. In this modified embodiment there is provided in the output of the receiver a network that selectively responds to the frequency of the source and including a transformer 15 the primary 19 of which is connected into the output circuit of the receiver and the secondary 17 of which is connected across the branch terminals of bridge rectifier 38. This bridge rectifier has connected across the center terminal of its branches relay 40 with capacitor $C_{15}$ and adjustable resistor $R_{12}$ in parallel with this relay; the resistor adjusting the sensitivity of the relay and the capacitor acting as a holding capacitor for the relay. The transformer and other components of this network have characteristics such that relay 40 is de-energized when the output of the receiver is said signal having a random repetition rate but is energized when it is the frequency of the supply voltage of the receiver as would be the case if the SCR was shorted. The relay 40 may be operative to actuate a suitable alarm device such as the arrangement shown, which is identical with that shown associated with relay 28 FIG. 1. Thus with this FIG. 7 network an indication is provided that the output of the receiver is not varying randomly but is varying in accordance with the supply frequency thereby indicating a fault.

The detection of the presence of the signal across the load $R_L$ representing an unstable flame condition is provided in FIG. 7 by means of the light 66 connected across the load with resistor 68 being provided in this connection. This light has a flicker frequency proportional to the stability of the flame. Higher flicker frequency represents a more stable flame. Therefore, the photo cell 47 output will vary with flame frequency. This photo cell is connected across the potential 49. Thus when the unstable flame condition signal appears at the output of the receiver, the photo cell will pass less current and cause relay 28 to drop out at the level established by potentiometer $R_{10}$. This drop out may actuate a suitable indicator or the like.

As previously described the transmitter of the indicating system of the invention is fail-safe. However if the SCR in the receiver should develop a short, the load $R_L$ would be activated by the potential supply. The checking or testing means disclosed and described in the embodiments of FIGS. 6 and 7 provide an indication for checking the satisfactory operation of the SCR as well as all other components of the circuit.

While a particular receiver circuit has been shown and described in the preferred embodiment of FIG. 1, other receiver circuit designs may be employed with several modified receiver designs being set forth in my co-pending application Ser. No. 235,098 filed on Nov. 2, 1962 under the title of "Flame Detector." Whatever the particular details of the design of the receiver, it fulfills the criterion and has the characteristic that incident to receiving as its input signal the randomly varying transmitter signal it produces at its output an amplified signal of randomly varying frequency with the frequency of this amplified output signal representing a stable flame being sufficiently different as to be readily distinguishable from that representing an unstable flame. In order to provide the combination of determining whether or not the flame is stable and provide an indication of whether or not the components of the circuit are operating properly the frequency of the potential supply of the receiver must be sufficiently different from the random repetition rate of the output signal that they may be readily distinguished.

When the output of the receiver is a load relay or other load activated by signals representing both a stable and unstable flame to provide an indication that a flame is present the amplified output signal is applied thereto and partially integrated so the load is activated with the signal thereacross being maintained above the level required to activate the load but varies above this level between an upper and a lower limit. For instance in a high voltage receiver circuit such as that of FIG. 1 employing a high voltage relay, the voltage across the relay may vary randomly, for example, from 100 to 150 volts incident to sensing a stable flame while the variation may be from 50 to 150 volts incident to sensing an unstable flame. Since the relay requires a considerably lower potential than 50 volts, such as 40 or 45 volts, to pull in and 25 volts to drop out, the relay will be maintained engaged as long as the output signal of the transmitter is coupled into the receiver.

In the event that there is a flame out and the transmitter signal thus terminated the load relay $R_L$ of the receiver will "drop out" in a fraction of a second. Tests have shown that the relay drop out time may be between .1 and 1.5 seconds after a sudden and complete loss of flame. The amount of time after flame out to obtain a flame out indication at the receiver load, or in other words to obtain drop out of the relay, will depend upon the circuit components and primarily the capacitors with the design being such as to maintain drop out in a very short period of time.

In the operation of flame indicators it is desired that the sensing element respond only to energy emitted by the flame and not other energy sources such as the energy admitted by hot refractory or hot tubes or glowing carbon that may be in the vicinity of the flame. Accordingly, the indicator of the present invention employing a glow discharge sensing tube utilizes a tube which responds to energy that lies generally within the spectrum range of 2000 to 3300 angstroms. Within this range the sensing tube will respond to photons emitted by the flame and will not respond to energy emitted from other sources such as glowing refractory. The wave lengths of the photons emitted by those other sources are somewhat above 3300 angstroms. Accordingly, the sensing tube operates in the ultraviolet spectrum range. In this designated range, i.e., between 2000 and 3300 angstroms, there exists a serious problem with regard to the detection of flames produced by burning of coal. The energy emitted from the coal fire in this spectrum range is rather limited being much less than that obtained with gas or oil fires and, accordingly, in order to detect coal fires by means of a glow discharge tube operating within this general spectrum, it is necessary that a very sensitive system be employed with so-called ultraviolet flame detectors of prior art design and as employed prior to applicant's invention being incapable of satisfactory operation with coal fires.

As explained hereinbefore when the UV tube is lightly loaded it is very sensitive, producing avalanches from relatively low energy photons and with the tube recovering after each such avalanche. By utilizing the flame indicator circuit of this invention with the UV tube not being heavily loaded, it has been possible to determine the presence or absence of flame in a coal fired installation and the quality of the flame in an entirely satisfactory manner with the result being accurate and dependable. Accordingly, with the invention there is provided a flame indicator system which operates satisfactorily on either gas, oil or coal firing and which is selectively responsive with regard to the energy spectrum range over which it is sensitive so that false indications of the presence of a flame are avoided.

The load as identified as $R_L$ in the various receiver circuits may take a variety of forms. It may be a relay which can operate a switching mechanism such as closing a switch when energized to provide an alarm either audible or visible or open a switch when energized and close a switch when de-energized to activate a suitable alarm. A relay may open one switch when energized and close another upon de-energization closing said one switch and opening said other switch with indicators being energized upon closing of the respective switches. Furthermore, the $R_L$ may not be a relay at all but rather may be the input load to a computer or signal static device, not requiring an intermediate relay. Still further, the $R_L$ may be a plurality of loads for instance relays, computers, lights, etc., all driven simultaneously from the same receiver.

While the potential source for the transmitter and receivers, as described hereinbefore, is stated to preferably be a 60-cycle per second source, this is by way of example only and is utilized merely because of its ready availability. It will be understood that the source for the transmitter and receiver may be any desired frequency so long as proper operation of the components of the circuits, for example the tube of the transmitter and the SCR of the receiver, may be obtained and so long as the period of the source is substantially longer (many times) than the time duration of the pulse produced in the circuit incident to avalanche (well over a millisecond) occurring in the tube so that the signal separator network can separate the pulse signal train from the AC source. From known pulse techniques it is considered that a difference of ten to one is desirable and will provide for ease of separation of the signals. In other words the effective frequency of the pulse should be ten times the frequency of the supply. It should be noted that with the tube lightly loaded so that it immediately returns to its high impedance state after avalanche, the source for the transmitter may be a DC potential although for ease of circuit design an AC source is preferred.

Accordingly, with the present invention there is provided a frame indicator utilizing a glow discharge tube as the sensing element and having a circuit which is simple and reliable and safe in its operation with the indicator being considerably more sensitive than so-called "UV" flame detectors of heretofore known design, and with it being necessary to mount only the detector tube on the furnace within which the flame is to be detected, with the indicator system providing an indication of whether the flame is stable or unstable as well as providing an indication of the presence or absence of flame and an indication as to the proper operation of the system.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. An electric flame condition indicating system comprising in combination an input and an output, a glow discharge sensing tube at said input operating out of saturation in response to the presence of flame, said sensing tube being effective to produce at said output a signal having a random frequency variation with said frequency being lower when sensing an unstable flame than when sensing a stable flame, said output including an impedance across which said signal is developed, said impedance comprising a relay with a holding capacitor connected thereacross such that the relay is operated by said randomly varying output signal produced incident to sensing a flame, and a tuned circuit connected across said impedance and tuned to a band of frequencies corresponding to those produced incident to sensing an unstable flame and means in said circuit activated by the signal developed across said impedance within the tuned frequency band operative to provide an indication when the output signal is of the lower frequency resulting from an unstable flame.

2. An electric flame condition indicator including a transmitter having a glow discharge sensing tube operating out of saturation and producing incident to sensing a stable flame an output signal of random repetition rate with a predetermined band and incident to an unstable flame an output signal of random repetition rate within a lower band, a receiver having an input and an output and provided with an AC supply having a repetition rate greater than either of said random rates, means coupling said output signal of the transmitter into the receiver as the input, the receiver producing at its output a driving signal having a random repetition rate varying as aforesaid incident to sensing a stable and unstable flame and wherein there is provided at the output of the receiver an integrating network operative to partially integrate said output signal producing a signal varying in amplitude in accordance with its random variation in frequency, a filter network connected across said integrator network passing both of said bands of frequencies while attenuating others and providing an indication of the presence or absence of a signal within said frequency band, and means in said filter network selectively responsive to an output signal having the repetition rate produced incident to an unstable flame.

3. The flame condition indicating system of claim 2 wherein said means in said filter network includes means selectively responsive to the amplitude of the signal developed across said integrating network.

4. The flame indication system of claim 2 wherein said means in said filter network includes means selectively responsive to the frequency of the signal developed across said integrating network.

References Cited
UNITED STATES PATENTS

| | | | |
|---|---|---|---|
| 2,524,100 | 10/1950 | Dauvillier et al. | 340—228X |
| 2,722,677 | 11/1955 | Krueger | 340—228.2 |
| 2,946,990 | 7/1960 | Klein | 340—228.2 |
| 3,129,332 | 4/1964 | Leen | 340—228UX |
| 3,154,724 | 10/1964 | Giuffrida | 340—228.2X |

THOMAS B. HABECKER, Primary Examiner

D. L. TRAFTON, Assistant Examiner

U.S. Cl. X.R.

328—6